United States Patent Office 2,720,784
Patented Oct. 18, 1955

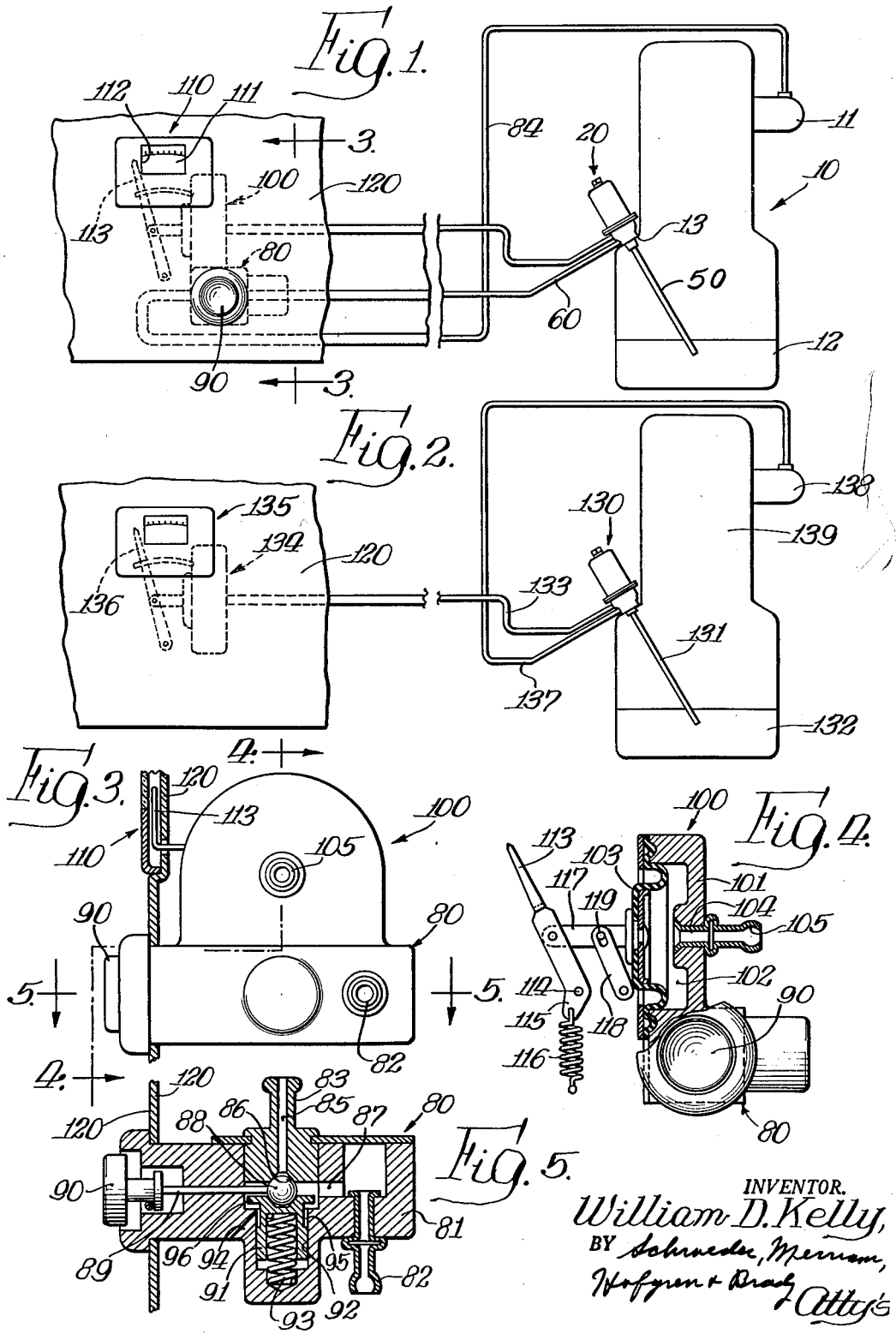
Oct. 18, 1955 — W. D. KELLY — 2,720,784
LIQUID LEVEL INDICATING MEANS
Filed Feb. 5, 1953 — 2 Sheets-Sheet 1
INVENTOR.
William D. Kelly,

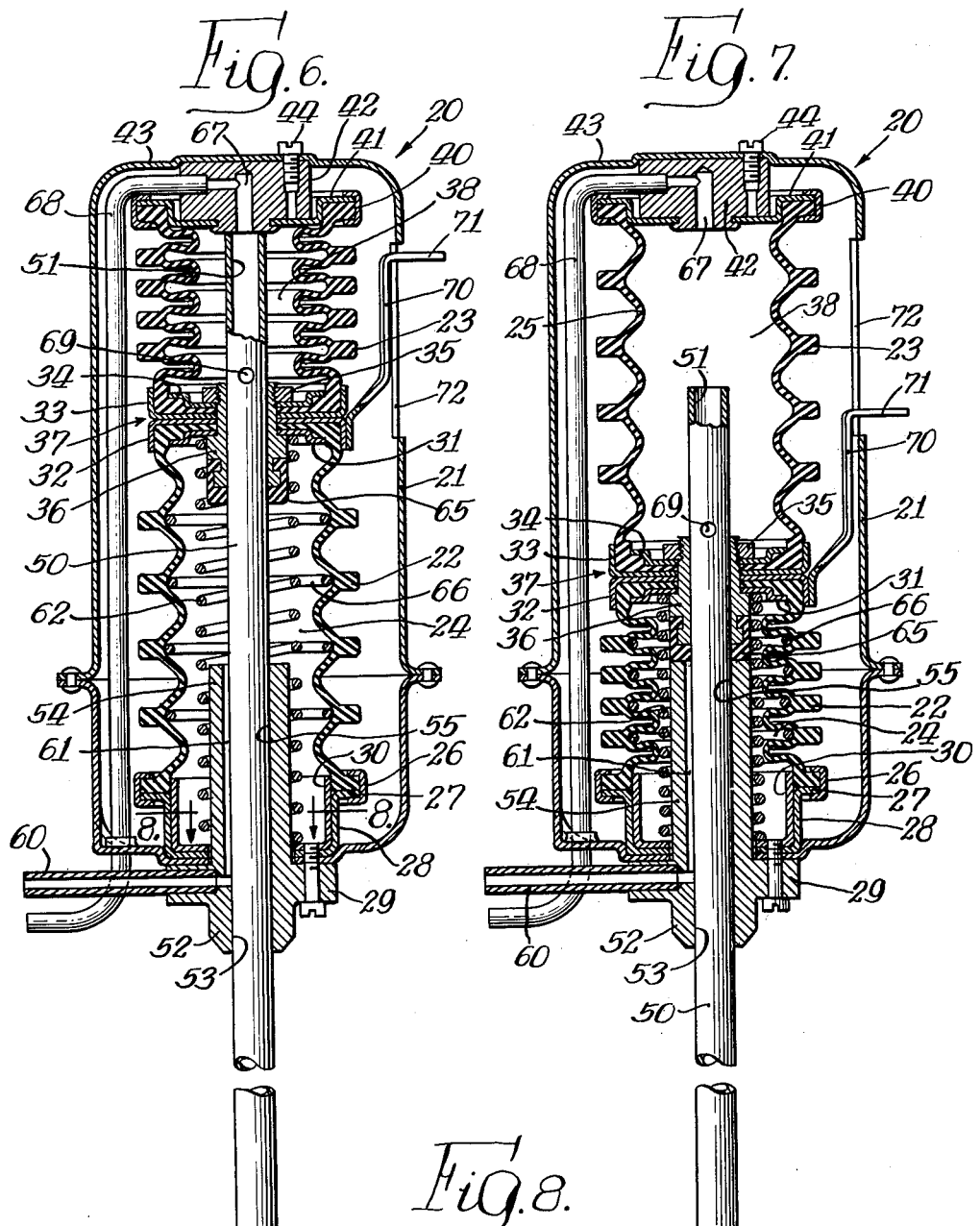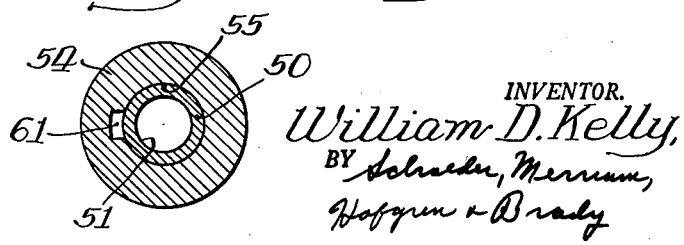

2,720,784

LIQUID LEVEL INDICATING MEANS

William D. Kelly, Western Springs, Ill.

Application February 5, 1953, Serial No. 335,305

7 Claims. (Cl. 73—290)

This invention relates to liquid level indicating means particularly adaptable for use to provide an indication of liquid level in a container.

It is the general object of this invention to produce a new and improved liquid level indicating means.

While it will be readily apparent to those skilled in the art that the principles of the liquid level indicating means hereinafter to be described may be utilized for indicating liquid level in a variety of applications, the invention is herein shown as embodied in a device for indicating the level of liquid in the crankcase of an internal combustion engine.

At the present time most internal combustion engines are provided with a crankcase sump for lubricating oil together with a lubricating pump for circulating the oil through the crankshaft of the engine and the bearings associated therewith. The lubricating oil serves not only to lubricate the various moving parts in the crankcase of an engine, but also as a cooling medium for conducting heat away from the bearings of the engine. Thus the lubricating oil has a dual function, both of which must be fulfilled by the lubricant in order to preserve and lengthen the life of the engine. Proper circulation of the oil may be indicated to the operator of the engine by providing a suitable oil pressure gauge connected to the discharge side of the oil pump and serving to indicate whether sufficient oil pressures are generated by the pump to force the lubricant through the various passages provided in the crankshaft, bearings, connecting rods, etc. Even though the oil is properly circulated, however, a sufficient reservoir of oil must be provided to give the lubricant an opportunity to lose the heat it has picked up and carried away from the bearings of the engine. Thus not only the pressure of the lubricant but also its quantity in the sump of the crankcase is important.

For the most part the quantity of oil in the crankcase of the engine may be measured only through the use of a dip-stick provided on the engine which extends into the crankcase and is inscribed with suitable graduations to indicate the level of the oil in the sump. The dip-stick must be removed and wiped clean and then reinserted through the dip-stick opening and again removed in order to determine the quantity of oil in the crankcase. If the internal combustion engine is on a vehicle this necessitates the stopping of the vehicle in order to check the quantity of oil in the crankcase.

According to this invention, however, there is provided a system wherein the oil level in the crankcase may be determined without the necessity of opening the hood of the vehicle and following out the procedure described above. Thus there may be provided an indicating means on the instrument panel of the vehicle which may either automatically or at the will of the operator indicate the level of oil in the crankcase without the necessity of stopping the engine or, if the engine is on a vehicle, of stopping the vehicle.

The device shown in the drawings and hereinafter to be described is an improvement on my copending applications Serial No. 310,265, filed September 18, 1952, now Patent No. 2,688,251, and No. 323,962, filed December 4, 1952.

One of the features of the present invention is the provision of an oil level indicating means which includes a pair of bellows, each having one end secured to a fixed wall and each being secured at its other end to a common movable wall, together with means for applying vacuum to the interior of one of the bellows to collapse that bellows while expanding the other bellows to produce a partial vacuum therein. A tube may be attached to the movable wall and thus is moved downwardly toward and into the liquid as the first bellows collapses, and during its movement and the consequent expansion of the other bellows, first permits air to be drawn into the interior of the expanding bellows and subsequently, after the tube has reached the oil level, draws oil into the tube to create and maintain a partial vacuum in the second bellows. Vacuum sensitive indicating means are provided and are connected to the interior of the second bellows to provide an indication of oil level. The amount of partial vacuum existing in the second bellows when the movable wall has completed its movement of course depends upon the height of the column of oil drawn into the tube which in turn is determined by the actual oil level, and thus the indicating means may give an accurate indication of such oil level.

Another feature of the present invention is the provision of means for preventing collapse of the bellows to which the vacuum is applied to effect movement of the movable wall. It is contemplated that in many installations the vacuum will be applied by connecting the bellows to the intake manifold of an internal combustion engine, and as such vacuum may be excessive means to prevent collapse of the bellows are desirably provided. Such means may take the form of a valve mechanism which, when the bellows reach fully collapsed position, cuts off the application of vacuum thereto and thus prevents injury to the bellows or false readings on the indicating means.

Other and further features of the invention will be readily apparent from the following description and drawings, in which:

Fig. 1 is a diagrammatic view showing an internal combustion engine equipped with the oil level indicating means of this invention;

Fig. 2 is a view like Fig. 1 of a modified form of the invention;

Fig. 3 is an enlarged view taken along line 3—3 of Fig. 1;

Fig. 4 is a sectional view taken along line 4—4 of Fig. 3;

Fig. 5 is a sectional view taken along line 5—5 of Fig. 3;

Fig. 6 is an enlarged vertical sectional view of a portion of the apparatus showing the tube and movable wall means in rest position;

Fig. 7 is a view like Fig. 6 showing the apparatus in gauging position; and

Fig. 8 is a sectional view along line 8—8 of Fig. 6.

While this invention is susceptible of embodiments in many different forms, there is shown in the drawings and will herein be described in detail the preferred embodiment, with the understanding that the present disclosure is to be considered as an exemplification of the principles of the invention and is not intended to limit the invention to the embodiment illustrated. The scope of the invention will be pointed out in the appended claims.

For the purpose of exemplary disclosure the apparatus and methods of the invention are shown as used in conjunction with an internal combustion engine such as the engine 10 of an automobile. The engine is provided with an intake manifold 11, a crankcase 12 and a dip-stick opening 13 normally accommodating the usual metal rod for measuring oil level. One part 20 of the apparatus of this invention is intended to replace the dip-stick and is so proportioned as to seat in the dip-stick opening without the necessity of modification of the engine.

As best shown in Figs. 6 and 7, the part 20 includes a generally cylindrical casing 21 in which are located a pair of bellows constituting a motor bellows 22 and a gauge bellows 23. Each of the bellows is preferably made of rubbery material and sealed at each end so as to provide within the motor bellows 22 a vacuum chamber 24 and within the gauge bellows 23 a gauge chamber 38. To so seal the bellows the lower end of the motor bellows is clamped between an annular channel member 26 and a flange 27 provided on a dish-like member 28 resting on the bottom closure plate 29 of the casing. To retain the lower end of the bellows in position there is provided an annular retaining ring 30 which is pressed into position engaging the interior walls of the member 28.

The upper end of the motor bellows 22 is clamped between a disk member 31 and a flanged disk member 32, with the clamping pressure being applied thereto through the medium of a second flanged disk member 33 which forms a part of the means for sealing the lower end of the gauge bellows 23. To keep the seal there is provided a smaller retaining disk 34 which overlies the lower end of the upper bellows and is pressed downwardly thereagainst by means of a nut 35 engaging the threads on a collar member 36. By tightening the nut 35 and disks 31—34 are held together to form a unitary movable wall means generally indicated at 37 serving to separate the interior of the bellows 22, namely the vacuum chamber 24 from the interior of the bellows 23 which form a gauge chamber 38.

The upper end of the gauge bellows is clamped between an annular channel member 40 and a disk member 41 which is secured to a boss portion 42 secured to the upper wall 43 of the casing by means of a screw 44.

Fixed to the collar member 36 is a tube 50 having its upper end 51 positioned in the gauge chamber 38 and extending downwardly and outwardly of the casing so as to position its opposite end above the normal level of oil in the crankcase. To correctly position the part 20 the bottom closure plate 29 of the casing is provided with a tapered boss portion 52 adapted to seat in the dip-stick opening of a crankcase, with the boss being hollow as indicated at 53 to slidably engage the tube 50. The bottom plate 29 is provided with an integral upstanding portion 54 which is provided with an opening 55 forming a guide means for the tube.

To effect the application of vacuum to the interior of the vacuum chamber 24 there is provided a passage 60 which communicates at one end with a slot 61 formed along the interior surface of the guide member 54 and opening to the interior of the vacuum chamber, with the opposite end of the passageway 60 being adapted to be connected to a source of vacuum as hereinafter described.

The bellows and tube are normally biased toward the rest position shown in Fig. 6 by a compression spring 62 which bears at one end against the disk 31 and at the other end against the bottom of the member 30.

In operation it is contemplated that vacuum will be applied to the vacuum chamber 24 to collapse the bellows 22, thus moving the movable wall 37 downwardly and expanding the gauge chamber 38. Means are provided for preventing radial collapse of the bellows 22 in the event the applied vacuum should be excessive. Such means may take the form of the resilient annular valve member 65 secured to one end of the collar 36 and adapted to seat over the open end of the slot 61 (as shown in Fig. 7) when the bellows and tube have been moved to the gauging position shown in Fig. 7. As the valve member 65 effectively closes off the slot 61 further application of vacuum to the vacuum chamber is prevented. To further prevent axial collapse of the bellows 22 each convolution thereof is supported by means of a light metallic ring 66 and similar rings may be provided for the bellows 23, if desired.

The boss 42 is provided with a vertical passage 67 which opens into the interior of the gauge chamber 38 and communicates with a passageway 68 adapted to be connected to a vacuum sensitive indicating means, and it will be noted that when in the rest position shown in Fig. 6 the upper end 51 of the tube surrounds the passageway 67. In order to balance the pressures within the gauge chamber the tube is also provided with a lateral opening 69 communicating with the gauge chamber.

While as previously noted downward movement of the movable wall 37 may be accomplished by the application of a vacuum to the vacuum chamber 24, means are provided for accomplishing such downward movement manually, such as may be desired when the engine is not running. Such means comprise an arm 70 provided with a finger engaging portion 71 at one end and fixed to the flanged disk 32 at the other end, with the finger portion 71 being reciprocable in a slot 72 formed in the side of the casing. Thus downward finger pressure on the portion 71 serves to move the movable wall from the rest position on Fig. 6 to the gauging position of Fig. 7.

Manually operable valve means are provided to connect the suction passage 60 to the intake manifold 11 of the engine to apply vacuum to the vacuum chamber 24. As shown in Fig. 5 the valve means 80 includes a casing 81 having a nipple 82 to be connected to the suction passage 60 and a second nipple 83 to be connected to a second line 84 in turn connected to the intake manifold. The casing is formed with a passage 85 communicating at one end with the nipple 83 and at the other end with an enlarged chamber 86 in the interior of the casing. A second passage 87 serves to establish communication between the chamber 86 and the nipple 82. A ball valve 88 is seated in the enlarged portion 86 and connected to one end of a rod 89 to the other end of which is connected a button 90 for moving the valve 88 in response to manual pressure.

A piston 91 is reciprocable in the casing 81 in a cylinder 92 formed therein. A spring 93 is provided for constantly urging the piston downwardly against the ball valve 88.

Inasmuch as the conduit 84 is constantly connected to the intake manifold and thus creates suction, means are provided for venting the suction except at the times when it is to be utilized for applying vacuum to the vacuum chamber 24. To this end the casing 81 is provided with a passage 94 opening at one end to the atmosphere and at the other end to an annular groove 95 formed in the cylinder 92. The annular groove is open at its inner end and thus is in communication with the enlarged chamber 86 which in turn is in communication with the passage 85 by reason of the fact that the portion of the chamber 86 at the inner end of the passage 85 does not conform exactly to the shape of the ball 88. When it is desired to apply vacuum to the vacuum chamber 24 the button 90 may be pushed inwardly. Such movement of the button unseats the valve 88 and simultaneously moves the piston 91 outwardly against the compression of the spring. Such outward movement of the piston causes a flange portion 96 thereof to seat against the lower portion of the cylinder 92 and thus block off the annular groove 95 while at the same time establishes communication between the passages 85 and 87 and thus to apply vacuum to the vacuum chamber.

Formed as a part of the manual valve 80 is a pressure responsive means 100 which includes a casing 101 (Fig.

4) having a chamber 102 formed therein closed on one side by a flexible diaphragm 103 (such as nylon or the like) with the chamber being provided with an opening 104 in its wall opposite the diaphragm which communicates with a nipple 105 connected to the passageway 68.

Indicating means 110 are associated with the pressure responsive means and includes an indicator having an inscribed face 111 visible through a window 112 as is an indicating finger 113. The finger 113 is pivoted at 114 to a suitable fixed pivot and is provided at its lower end with an offset arm 115 to which is connected a spring 116 for constantly urging the finger to the position shown in Fig. 4. A rigid member 117 is secured at one end to the diaphragm 103 and is pivotally connected at its other end to the finger 113. To steady the member 117 a pivotally mounted support arm 118 is provided which is pivotally connected to the member 117 through the pin arrangement 119 shown.

In operation the valve means 80 and its associated pressure responsive means 100 and indicating means 110 are preferably mounted on the instrument panel 120 of a vehicle. When it is desired to ascertain the amount of oil in the crankcase the button 90 is pushed inwardly so as to establish communication between the lines 84 and 60 and thus to apply vacuum to the vacuum chamber. Such vacuum causes the movable wall to move downwardly carrying the tube 50 from the rest position indicated in Fig. 6, wherein the end of the tube is positioned slightly above the level of oil in the crankcase, to the gauging position shown in Fig. 7 where the lower end of the tube is below the oil level. As the tube 50 is moved downwardly the gauge chamber 38 is expanded but while the lower end of the tube is still above the oil level, the air within the crankcase is drawn into the tube and into that chamber. As soon as the lower end of the tube contacts the surface of the oil and is thereafter immersed therein, oil rather than air is drawn into the tube. As the chamber 38 has a cross sectional area many times that of the tube 50, a sizable column of oil is drawn into the tube 50 and the hydrostatic head thus formed creates a partial vacuum within the chamber 38. The amount of vacuum created in the chamber 38 is of course dependent upon the height of the column of oil drawn into the tube 50 which in turn is dependent upon the oil level. If the oil level is low the tube will move downwardly through a relatively large movement before the lower end is immersed in the oil and hence a small column of oil will be drawn into the tube. If the oil level is high the lower end of the tube will be immersed in the oil after comparatively short movement, and thus by the time the movable wall has completed its downward movement and has assumed the position of Fig. 7, a relatively high column of oil will be drawn into the tube.

The partial vacuum created within the chamber 38 is communicated to the chamber 102 through the passageway 68 and thus serves to draw the diaphragm 103 to the right (as shown in Fig. 4) a distance commensurate with the degree of vacuum in the chamber 38. Such rightward movement of the diaphragm of course pivots the indicating finger 113 to the right to a position across the inscribed face 111 to indicate the quantity of oil.

In the normal automobile the oil level varies about an inch and a quarter between the full level and the level wherein the quantity of oil is approximately three quarts short. Thus it is preferable that the degree of movement of the movable wall be approximately one and one quarter inch so that the tube 50 is moved through that distance from the position shown in Fig. 6 to that of Fig. 7. Of course if the oil level is more than three quarts down the tube will not contact the surface and hence no vacuum will be created in the chamber 38 and the indicator 113 will remain in the position shown in Fig. 1 indicating a need of oil. As most dip-stick openings are approximately three eighths inch in diameter, the tube 50 may advantageously have a diameter of one quarter inch and the portion 52 is proportioned so as to have a firm fit in the dip-stick opening.

It is of course unnecessary that the portion 52 sealingly engage the dip-stick opening inasmuch as it is immaterial whether or not gas leaks beyond the seat. If desired the lower end of the tube 50 may be inscribed with the usual markings so that it may be used in the same manner as the ordinary dip-stick.

In the embodiment of the invention just described a measure or indication of oil level is available to the operator at any time when the engine is running, regardless of whether the vehicle is in motion or not. To provide an accurate indication the push button 90 should not be depressed unless the vehicle is running on a straight and level road. If the vehicle is rounding a sharp turn at high speed the oil in the crankcase will not be level and thus a false or erroneous indication will result.

In the second form of the invention shown in Fig. 2 an indication of oil level is given automatically as soon as the engine is started. For this purpose the portion of the apparatus 130 to be positioned in the dip-stick opening is fabricated in the same manner as the device shown in Figs. 6 and 7 of the previous embodiment and is provided with a tube 131 movable downwardly toward the level of oil in the crankcase sump 132. The expandable chamber is connected through a conduit 133 to pressure responsive means 134 similar to the means 100 previously described which in turn is connected to an indicating means 135 provided with an indicating finger 136. A second conduit 137 connects the vacuum chamber in the device 130 with the intake manifold 138 of the internal combustion engine 139 with which it is associated. In this apparatus as soon as the engine is started vacuum is applied through the conduit 137 to the vacuum chamber to draw the movable wall downwardly and thus to create a partial vacuum in the gauging chamber as soon as the tube 131 becomes immersed in the oil. Such partial vacuum is immediately transmitted to the pressure responsive means 134 and results in movement of the indicating finger to indicate oil level. Thus as soon as the engine is started visual indication is given to the operator of the amount of oil present in the crankcase. Such indications are only available when the engine is started as leakage, etc. will introduce errors into the indication after the engine has been operated for some time.

I claim:

1. A device for determining oil level in the crankcase of an internal combustion engine comprising a gauge chamber, a vacuum chamber, movable wall means separating the chambers, a tube attached to the wall means and opening at one end to the interior of the gauge chamber and adapted to open at the other end to the interior of the crankcase, a vacuum sensitive signalling device connected to the gauge chamber and responsive to a vacuum therein to provide a signal, a conduit for connecting the vacuum chamber with the intake manifold of the engine to evacuate the vacuum chamber to cause movement of the wall means in a direction collapsing the vacuum chamber and expanding the gauge chamber, whereby to produce a vacuum in the gauge chamber when the oil covers the first mentioned end of the tube, and valve means automatically operable when the vacuum chamber reaches fully collapsed position to close said conduit.

2. A device for determining oil level in the crankcase of an internal combustion engine comprising a gauge chamber, a vacuum chamber, movable wall means separating the chambers, a tube attached to the wall means and opening at one end to the interior of the gauge chamber and adapted to open at the other end to the interior of the crankcase, a vacuum sensitive signalling device connected to the gauge chamber and responsive to a vacuum therein to provide a signal, a conduit opening at one end into the vacuum chamber and connected to the intake manifold of the engine to evacuate the vacuum chamber to cause movement of the wall means in a direction collapsing the vacuum chamber and expanding the gauge chamber, whereby to produce a vacuum in the gauge chamber when the oil covers the first mentioned end of the tube, and valve means carried by the wall means and positioned to close off the conduit opening into the vacuum chamber when the vacuum chamber reaches fully collapsed position.

3. A device for determining liquid level in a container comprising a gauge chamber, a vacuum chamber, movable wall means separating the chambers, a tube connected to the wall means and opening at one end into the gauge chamber with the other end of the tube being adapted to open into the container, a vacuum sensitive signalling device connected to the gauge chamber and responsive to a vacuum therein to provide a signal, a conduit for connecting the vacuum chamber with a source of vacuum for evacuating the vacuum chamber to cause movement of the wall means in a direction collapsing the vacuum chamber and expanding the gauge chamber, said movement of the wall means being adapted to move the tube from a rest position, wherein said other end is above the liquid level in the container, downwardly toward and into the liquid to a second position, said movement of the wall means drawing gas into the gauge chamber until said other end of the tube reaches the liquid level and thereafter drawing liquid into the tube to create a partial vacuum in the gauge chamber, and valve means carried by the wall means and positioned to close off the conduit when the tube reaches said second position.

4. A device for determining oil level in the crankcase of an internal combustion engine comprising a casing, a motor bellows in the casing and sealed thereto at one end, a gauge bellows in the casing and sealed thereto at one end, a movable wall sealed to the other end of each of the bellows to provide a vacuum chamber within the motor bellows and a gauge chamber within the gauge bellows, a tube fixed to the movable wall and opening at one end into the gauge chamber with the other end of the tube being adapted to open into the crankcase, a vacuum sensitive signalling device connected to the gauge chamber and responsive to a vacuum therein to provide a signal, and means forming a passage for connecting the vacuum chamber with a source of vacuum for evacuating the vacuum chamber to cause movement of the movable wall in a direction collapsing the motor bellows and expanding the gauge bellows, said movement of the movable wall being adapted to move the tube from a rest position, wherein said other end is above the liquid level in the container, downwardly toward and into the liquid to a second position, said movement of the movable wall drawing gas into the gauge chamber until said other end of the tube reaches the liquid level and thereafter drawing liquid into the tube to create a partial vacuum in the gauge chamber.

5. A device for determining oil level in the crankcase of an internal combustion engine comprising a casing having a hollow portion adapted to seat in the dip-stick opening of the crankcase, a substantially cylindrical motor bellows of rubbery material in the casing and sealed thereto at one end, a guage bellows in the casing and sealed thereto at one end, a movable wall sealed to the other end of each of the bellows to provide a vacuum chamber within the motor bellows and a gauge chamber within the gauge bellows, means in the vacuum chamber for preventing radial collapse of the motor bellows, an elongated hollow guide member in the casing having a portion surrounding the hollow in said portion of the casing and having another portion extending axially of the motor bellows, a tube fixed to the movable wall and opening at one end into the gauge chamber, said tube extending through the hollows in the guide member and said portion of the casing to position its other end in the crankcase, a vacuum sensitive signalling device connected to the gauge chamber and responsive to a vacuum therein to provide a signal, means forming a passage for connecting the vacuum chamber with a source of vacuum for evacuating the vacuum chamber to cause movement of the movable wall in a direction axially collapsing the motor bellows and expanding the gauge bellows, said movement of the movable wall being adapted to move the tube from a rest position, wherein said other end of the tube is above the oil level in the crankcase, downwardly toward and into the oil to a second position, said movement of the movable wall drawing gas into the gauge chamber until said other end of the tube reaches the oil level and thereafter drawing oil into the tube to create a partial vacuum in the gauge chamber.

6. A device for determining oil level in the crankcase of an internal combustion engine comprising a casing having a hollow portion adapted to seat in the dip-stick opening of the crankcase, a substantially cylindrical motor bellows of rubbery material in the casing and sealed thereto at one end, a gauge bellows in the casing and sealed thereto at one end, a movable wall sealed to the other end of each of the bellows to provide a vacuum chamber within the motor bellows and a gauge chamber within the gauge bellows, an elongated hollow guide member in the casing having a portion surrounding the hollow in said portion of the casing and having another portion extending axially of the motor bellows, a slot in the last mentioned portion and providing an air passage opening into the vacuum chamber, a tube fixed to the movable wall and opening at one end into the gauge chamber, said tube extending through the hollows in the guide member and said portion of the casing to position its other end in the crankcase, a vacuum sensitive signalling device connected to the gauge chamber and responsive to a vacuum therein to provide a signal, means forming a passage for connecting the slot with a source of vacuum for evacuating the vacuum chamber to cause movement of the movable wall in a direction axially collapsing the motor bellows and expanding the gauge bellows, said movement of the movable wall being adapted to move the tube from a rest position, wherein said other end of the tube is above the oil level in the crankcase, downwardly toward and into the oil to a second position, said movement of the movable wall drawing gas into the gauge chamber until said other end of the tube reaches the oil level and thereafter drawing oil into the tube to create a partial vacuum in the gauge chamber, and a valve member carried by the movable wall and surrounding the tube, said valve member being positioned to close the slot opening when the tube reaches said second position.

7. A device for determining oil level in the crankcase of an internal combustion engine comprising a casing having a hollow portion adapted to seat in the dip-stick opening of the crank case, a substantially cylindrical motor bellows of rubbery material in the casing and sealed to a fixed wall at one end thereof, a gauge bellows of rubbery material in the casing and sealed to a fixed wall at one end thereof, a movable wall sealed to the other end of each of the bellows to provide a vacuum chamber within the motor bellows and a gauge chamber within the gauge bellows, an elongated hollow guide member in the casing having a portion surrounding the hollow in said portion of the casing and having another portion extending axially of the motor bellows and within the vacuum chamber, a slot in the last mentioned portion and providing an air passage opening into the vacuum chamber, a tube fixed to the movable wall, said tube opening at one end into the gauge chamber and being provided with a lateral opening in said gauge chamber, said tube extending through the hollows in the guide member and said portion of the casing to position its other end in the crankcase, means forming a passageway opening through the fixed wall closing one end of the gauge bellows, a vacuum sensitive signalling device connected to said passageway and responsive to a vacuum in the gauge chamber to provide a signal, other means forming a passage for connecting the slot with a source of vacuum for evacuating the vacuum chamber to cause movement of the movable wall in a direction axially collapsing the motor bellows and expanding the gauge bellows, said movement of the movable wall being adapted to move the tube from a rest position, wherein the first mentioned end of the tube abuts the fixed wall in the gauge chamber and surrounds the passageway opening and the other end of the tube is above the oil level in the crankcase, downwardly toward and into the oil to a second position, said movement of the movable wall drawing gas into the gauge chamber until said other end of the tube reaches the oil level and thereafter drawing oil into the tube to create a partial vacuum in the gauge chamber, and a valve member carried by the movable wall and surrounding the tube, said valve member being positioned to close the slot opening when the tube reaches gauging position.

References Cited in the file of this patent

UNITED STATES PATENTS

| | | |
|---|---|---|
| 1,239,565 | Collinson | Sept. 11, 1917 |
| 1,383,866 | Shephard | July 5, 1921 |
| 1,804,695 | Knobloch | May 12, 1931 |
| 2,305,102 | O'Neil | Dec. 15, 1942 |
| 2,645,125 | Miller | July 14, 1953 |
| 2,688,251 | Kelly | Sept. 7, 1954 |